United States Patent
Taruguchi

(10) Patent No.: US 7,406,594 B2
(45) Date of Patent: Jul. 29, 2008

(54) METHOD AND APPARATUS FOR CERTIFICATION AND AUTHENTICATION OF USERS AND COMPUTERS OVER NETWORKS

(75) Inventor: Hideaki Taruguchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 801 days.

(21) Appl. No.: 10/282,656

(22) Filed: Oct. 29, 2002

(65) Prior Publication Data
US 2003/0084282 A1 May 1, 2003

(30) Foreign Application Priority Data

| Oct. 31, 2001 | (JP) | ............................. 2001-335674 |
| Oct. 7, 2002 | (JP) | ............................. 2002-293657 |

(51) Int. Cl.
*H04L 9/00* (2006.01)
(52) U.S. Cl. .................................... 713/155
(58) Field of Classification Search .................. 713/155
See application file for complete search history.

(56) References Cited

U.S. PATENT DOCUMENTS

| 6,996,711 | B2 * | 2/2006 | Patterson et al. ............ 713/156 |
| 7,036,146 | B1 * | 4/2006 | Goldsmith .................... 726/21 |
| 2001/0049787 | A1 * | 12/2001 | Morikawa et al. ........... 713/156 |
| 2002/0069129 | A1 * | 6/2002 | Akutsu et al. ................. 705/26 |
| 2003/0055935 | A1 * | 3/2003 | Tarrant et al. ............... 709/223 |
| 2003/0056114 | A1 * | 3/2003 | Goland ....................... 713/201 |

OTHER PUBLICATIONS

Okamoto, Eiji, "An Introduction to Cryptographic Theory," Kyoritsu Shuppan Co., Ltd.

* cited by examiner

*Primary Examiner*—Kambiz Zand
*Assistant Examiner*—Aubrey H Wyszynski
(74) *Attorney, Agent, or Firm*—Pillsubury Winthrop Shaw Pittman LLP

(57) ABSTRACT

A certification method realized by a certification server is applied to a networking system containing at least one local network connecting together terminals that constitute a same group to share a local session therebetween. When one terminal requests certification, the certification server sends an inter-group ID to the terminal while sending an authentication request to each of the other terminals of the same group. Then, the certification server determines to perform certification on the terminal based on results of authentication that is performed by each of the users of the other terminals in a face-to-face manner. Herein, the certification server can determine whether to certify the terminal based on secret information, which are disassembled and allocated to the terminals respectively. Thus, it is possible to reliably perform certification and authentication on terminals and users.

20 Claims, 17 Drawing Sheets

FIG. 6

SESSION MANAGEMENT TABLE

| GROUP SESSION ID | INTER-GROUP ID | USER ID | TERMINAL ID | SECRET INFORMATION |
|---|---|---|---|---|
| 123456789 | 0 | — | — | |
| 123456789 | 1 | tanaka | 090-1234-5678 | |
| 123456789 | 2 | yamada | 090-2345-6789 | |
| 123456789 | 3 | suzuki | 090-3456-7890 | |
| ......... | | ......... | ......... | |

FIG. 9

SESSION MANAGEMENT TABLE

| GROUP SESSION ID | INTER-GROUP ID | USER ID | TERMINAL ID | SECRET INFORMATION |
|---|---|---|---|---|
| 123456789 | 0 | — | — | YAMAKAWAUMI |
| 123456789 | 1 | tanaka | 090-1234-5678 | YAMA |
| 123456789 | 2 | yamada | 090-2345-6789 | KAWA |
| 123456789 | 3 | suzuki | 090-3456-7890 | UMI |
| ......... | ......... | ......... | ......... | |

FIG. 16

SESSION MANAGEMENT TABLE

| GENERAL GROUP SESSION ID | GROUP SESSION ID | INTER-GROUP ID | USER ID | TERMINAL ID | SECRET INFORMATION | PREVIOUS SESSION ID | PREVIOUS SESSION USER ID | PREVIOUS SESSION TERMINAL ID |
|---|---|---|---|---|---|---|---|---|
| 123456789 | A | 0 | - | - | | | | |
| 123456789 | A | 1 | Tanaka | 090-1234-5678 | | 2356789 | Sato | 090-456-7890 |
| 123456789 | A | 2 | Yamada | 090-2345-6789 | | 34567890 | Ando | 090-678-9012 |
| 123456789 | A | 3 | Suzuki | 090-3456-7890 | | | | |
| 123456789 | B | 1 | Sato | 090-4567-8901 | | 23456789 | Tanaka | 090-123-4567 |
| 123456789 | B | 2 | Takahashi | 090-5678-9012 | | | | |
| 123456789 | B | 3 | Ando | 090-6789-0123 | | 34567890 | Yamada | 090-234-5678 |
| .. | .. | .. | .. | .. | | | | |

FIG. 17

SESSION MANAGEMENT TABLE

| GENERAL GROUP SESSION ID | GROUP SESSION ID | INTER-GROUP ID | USER ID | TERMINAL ID | SECRET INFORMATION | PREVIOUS SESSION ID | PREVIOUS SESSION USER ID | PREVIOUS SESSION TERMINAL ID |
|---|---|---|---|---|---|---|---|---|
| 123456789 | A | 0 | — | — | YAMA-KAWA-UMI-KAKI-KURI-MOMO | | | |
| 123456789 | A | 1 | Tanaka | 090-1234-5678 | YAMA | 2356789 | Sato | 090-456-7890 |
| 123456789 | A | 2 | Yamada | 090-2345-6789 | KAWA | 34567890 | Ando | 090-678-9012 |
| 123456789 | A | 3 | Suzuki | 090-3456-7890 | UMI | | | |
| 123456789 | B | 1 | Sato | 090-4567-8901 | KAKI | 23456789 | Tanaka | 090-123-4567 |
| 123456789 | B | 2 | Takahashi | 090-5678-9012 | KURI | | | |
| 123456789 | B | 3 | Ando | 090-6789-0123 | MOMO | 34567890 | Yamada | 090-234-5678 |
| .. | .. | .. | .. | .. | | | | |

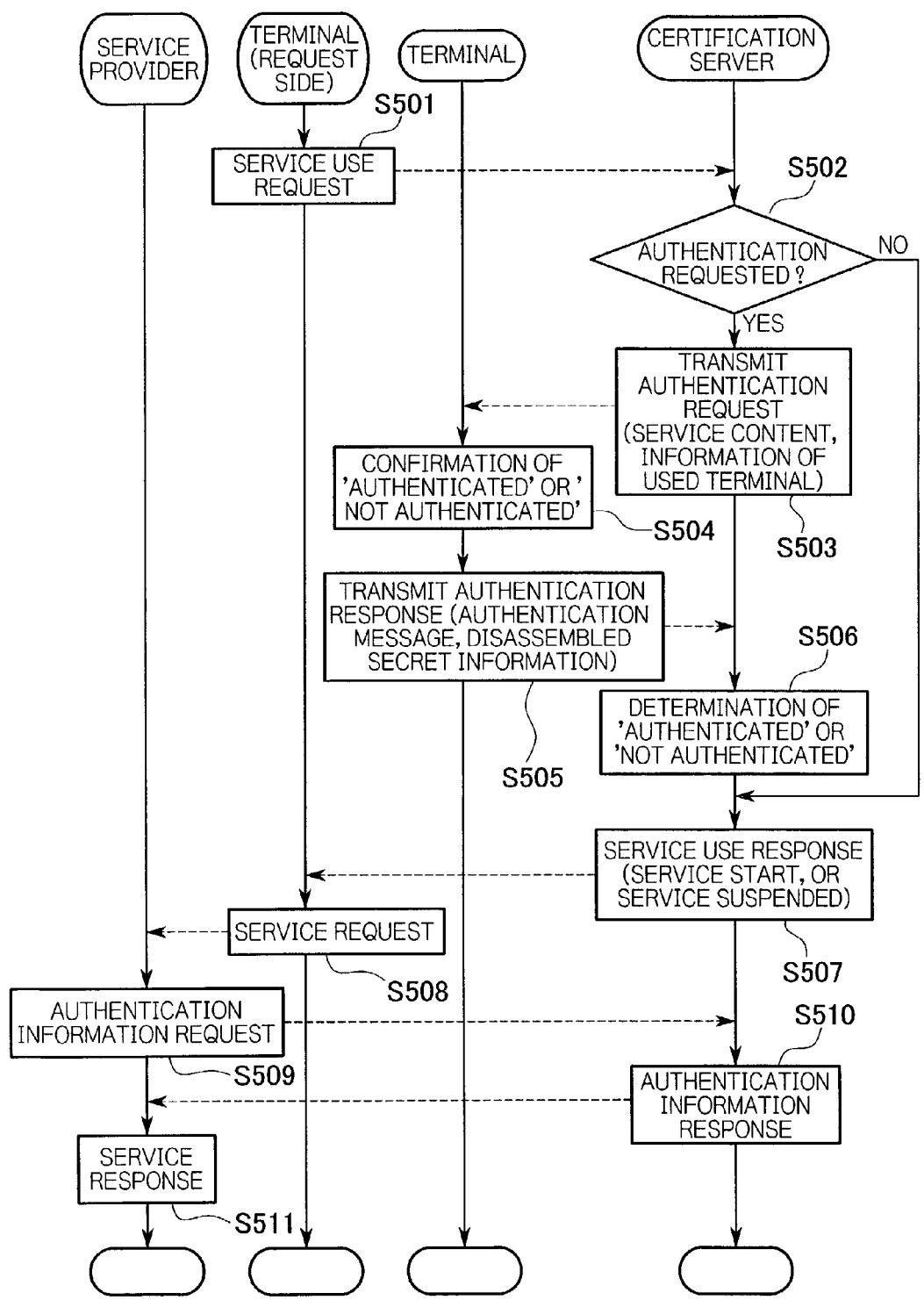

METHOD AND APPARATUS FOR CERTIFICATION AND AUTHENTICATION OF USERS AND COMPUTERS OVER NETWORKS

BACKGROUND OF THE INVENTION

1. Field of the Invention

This invention relates to methods and apparatuses for certification and authentication of users and computers over networks.

2. Description of the Related Art

Conventionally, user IDs and passwords are both used to verify (or authenticate) users over networks, an example of which is described in a book entitled "Introduction To Coding Theory" written by Eishi Okamoto and published by Kyoritsu Shuppan Kabushiki Kaisha in 1993 in Japan (in particular, pages 132-133). Herein, several pieces of information regarding users of personal computers or terminals are registered with servers in advance. That is, the server stores user IDs, which are assigned to users in advance, and passwords that only the users may know in the storage thereof. In order to use online functions over the network, the user inputs his/her identification number (i.e., user ID) and password by operating a terminal connected with the server via the network. Then, the server makes a determination as to whether or not the input information transmitted thereto via the network match the information stored in the storage thereof. Thus, the server can verify the user who is actually and certainly registered therewith.

Recently, electronic certification services using coding techniques (or encryption) are widely spread in the fields of computer communications and networking services, an example of which is described in the aforementioned book (in particular, pages 133 and 134). In order to use the electronic certification service, the user transmits the prescribed information including a public key regarding encryption (or decryption) to an online certification agency (or organization), which in turn issues a digital ID for the user and stores the public key in the storage. When a user wishes another user to be verified the identity of the other via the network, the user transmits to the other user the aforementioned digital ID and public key together with an electronic signature using a private key (or secret key) regarding encryption (or decryption). Then, the other user transmits the received digital ID to the certification agency, which in turn returns the public key that is stored in correspondence with the digital ID. Thus, the other user compares the public key, which is directly received from the user, with the public key that is transmitted thereto from the certification agency. When there is a match, the other user can verify the user as requested.

The aforementioned technology may ensure mutual certification between computers (e.g., server and terminal) over the network. However, there is a problem that certification may not be reliably performed as to whether or not the computers are actually used by the authorized users. In the method using passwords, an unauthorized person, who differs from the authorized user, may be able to obtain an online certification by operating the terminal and inputting private information of the authorized user such as the user ID and password, which may have been obtained unfairly or illegally. That is, there remains a possibility that unauthorized persons may succeed in using online services, which are provided for authorized users, in unfair or illegal ways. In addition, the aforementioned electronic certification using encryption use digital IDs and public (or private) keys, wherein a third party may be able to act as an authorized user by manipulating the computer dishonestly.

In summary, the conventional certification technology may have abilities of certifying computers whose users are registered with servers and the like. However, it cannot reliably perform certification as to whether or not computers are actually being operated by authorized users.

SUMMARY OF THE INVENTION

It is an object of the invention to provide a method and an apparatus for performing certification and authentication with respect to computers and authorized users over networks.

A certification method of this invention is realized by a certification server and is applied to a networking system containing at least one local network connecting together terminals that constitute a same group to share a local session therebetween. When a terminal requests certification, the certification server sends an inter-group ID to the terminal while sending an authentication request to each of the other terminals of the same group. Thus, the other terminals each perform authentication on the terminal requesting certification in a face-to-face manner. Then, the certification server determines to perform certification on the terminal based on authentication results. It is possible to interconnect together multiple local networks with the certification server via a wide area network, wherein all terminals connected with these local networks are combined together to form a general group to share a general local session, so that each local network is represented by a session master, while the general local session is represented by a general session master.

In addition, the certification server creates and disassembles secret information, so that disassembled pieces of the secret information are transmitted to the terminals of the same group or the terminals of the general group. Thus, the certification server makes a determination as to whether to certify the terminal based on the disassembled pieces of the secret information, which are collected from the other terminals.

Thus, it is possible to reliably perform certification and authentication on terminals and users.

BRIEF DESCRIPTION OF THE DRAWINGS

These and other objects, aspects, and embodiments of the present invention will be described in more detail with reference to the following drawing figures, in which:

FIG. 6 shows examples of data and configurations stored in a session management table held in the certification server;

FIG. 9 shows examples of data and configurations of the session management table at completion of the secret information disassembling process;

FIG. 16 shows examples of data and configurations stored in a session management table held in the certification server;

FIG. 17 shows examples of data and configurations that are stored in the session management table after completion of a secret information disassembling process; and FIG. 18 is a flowchart showing an authentication process.

DESCRIPTION OF THE PREFERRED EMBODIMENTS

This invention will be described in further detail by way of examples with reference to the accompanying drawings.

Figure 1:
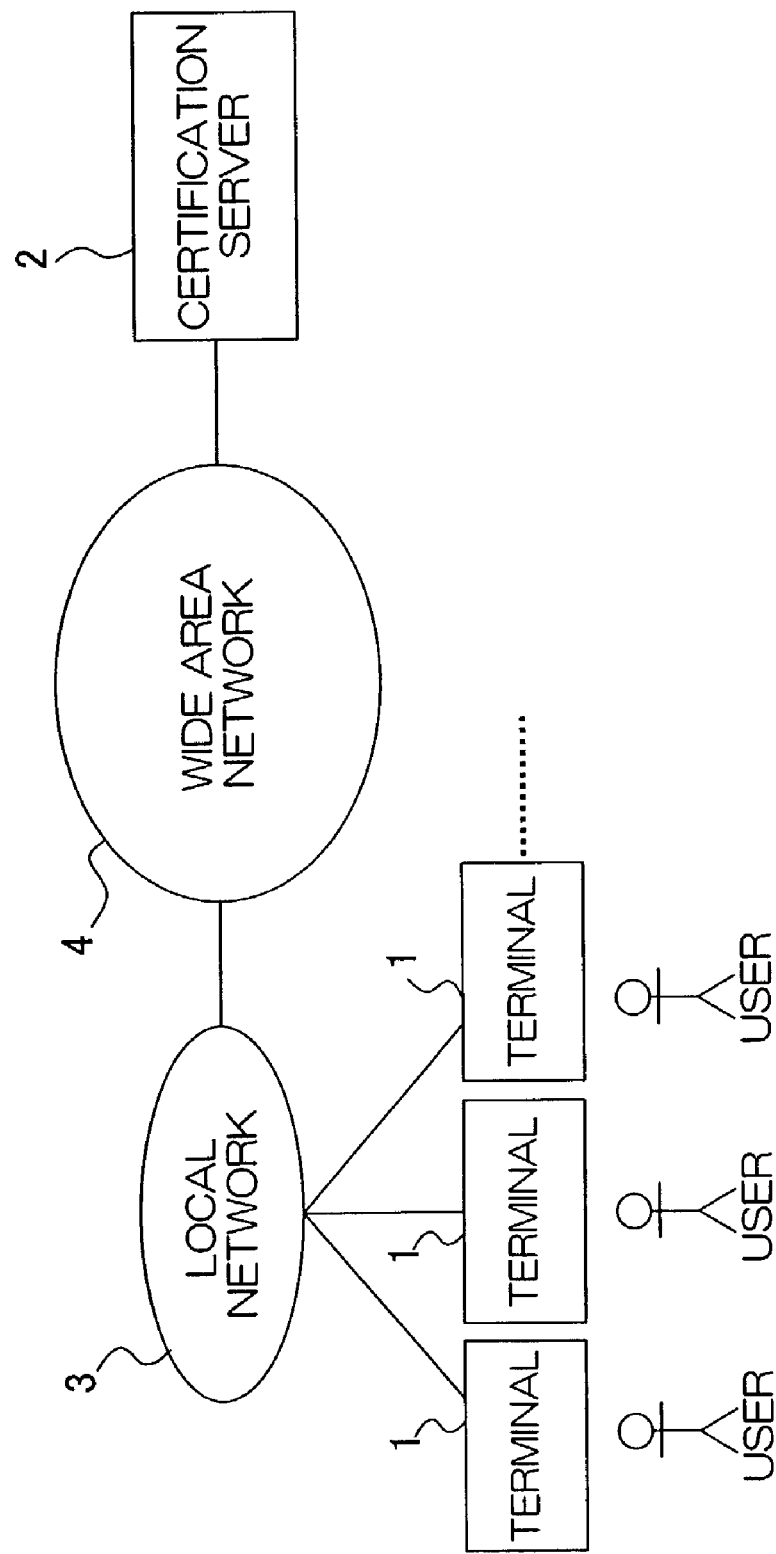
FIG. 1 is a schematic diagram showing the overall configuration of a communication network system in accordance with a first embodiment of the invention.

FIG. 1 shows an example of the overall configuration of a communication network system, to which a first embodiment of this invention is applied, wherein reference numeral 1 designates terminals, 2 designates a certification server, 3 designates a local network (or local area network), and 4 designate a wide area network. That is, a large number of terminals 1 are connected with the local network 3, which is connected with the wide area network 4. The certification server 2 is also connected with the wide area network 4.

The aforementioned communication network of FIG. 1 allows both the terminals 1 and the certification server 2 to engage mutual communications therebetween over the local network 3 and the wide area network 4. In addition, all the terminals 1 are capable of communicating with each other over the local network 3. Herein, it is possible to provide peer-to-peer networking abilities to allow the terminals 1 to directly send and receive messages therebetween. Alternatively, the terminals 1 may be capable of communicating with each other via the certification server 2, or they may be capable of communicating with each other via other servers (not shown) that are directly connected with the local network 3.

Any type of communication protocol may be applied to the aforementioned communication network of FIG. 1. For example, it is possible to employ 'TCP/IP' (Telecommunications Protocol Internet Protocol, where 'TCP' stands for 'Transmission Control Protocol').

Each of the terminals 1 provides both communication functions and information processing functions. As the terminals 1, it is possible to use personal computers, portable or fixed telephone terminals, and PDA (Personal Digital Assistant) devices, for example.

As the local network 3, it is possible to use LANs (Local Area Networks) using prescribed protocols and cables such as Ethernet (registered trademark), and wireless LANs using wireless communications such as bluetooth. Alternatively, it is possible to use portable telephone networks and PHS (Personal Handyphone System) networks, each of which may be managed by a single base station. That is, the local network 3 corresponds to communication networking for a relatively narrow range or space in communications. The present embodiment is characterized in that users of the terminals 1 are classified into groups in connection with the local network 3, wherein certification is realized by managing local sessions with respect to each group. The local sessions correspond to communications and transactions of data as well as local data processing among the terminals 1 belonging to each group. Each group is constituted by a related set of the terminals 1, which are handled by prescribed constituent members such as workers of the same office and friends who know each other. Therefore, the constituent members of each group use local networking within a relatively small area in which they may have visual contacts with each other.

As the wide area network 4, it is possible to use the Internet, public telephone networks, mobile communication networks, and private communication networks, for example. Of course, it is possible to arbitrarily combine desired ones of these networks as the wide area network 4.

Figure 2:
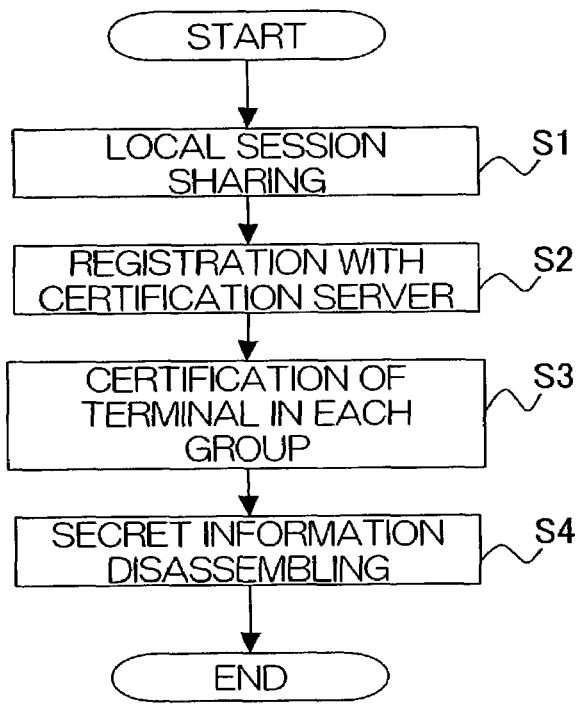
FIG. 2 is a flowchart showing a certification process.

FIG. 2 is a flowchart showing outline procedures of a certification process (or verification process) in accordance with the first embodiment of this invention. In step S1, local sessions are established by units of groups each constituted by the prescribed users of the terminals 1 respectively. This allows the users to share the local sessions respectively. In step S2, the users belonging to the established local sessions are each registered with the certification server 2. In step S3, the certification server 2 performs certification with respect to the users. In step S4, secret information (or private information) of the certified users is subjected to disassembling processing. Detailed procedures of the certification process will be described later.

Figure 3:
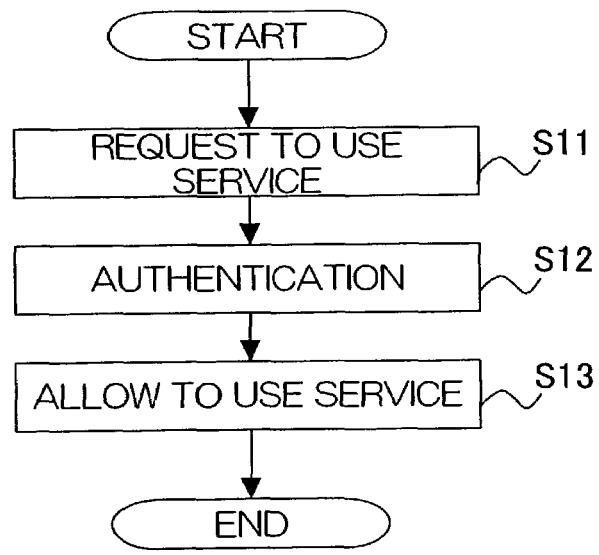
FIG. 3 is a flowchart showing an authentication process.

FIG. 3 is a flowchart showing outline procedures of an authentication process that is performed when the users proceed to prescribed online services via networks. In step S11, the users issue requests for using the services. In step S12, the other users sharing the local sessions authenticate the users who request to use the services. Based on authentication results, the users are allowed or authorized to use the services in step S13. Detailed procedures of the authentication process will be described later.

Next, detailed procedures of the certification process of FIG. 2 will be described with reference to FIGS. 4 to 9.

Figure 4:
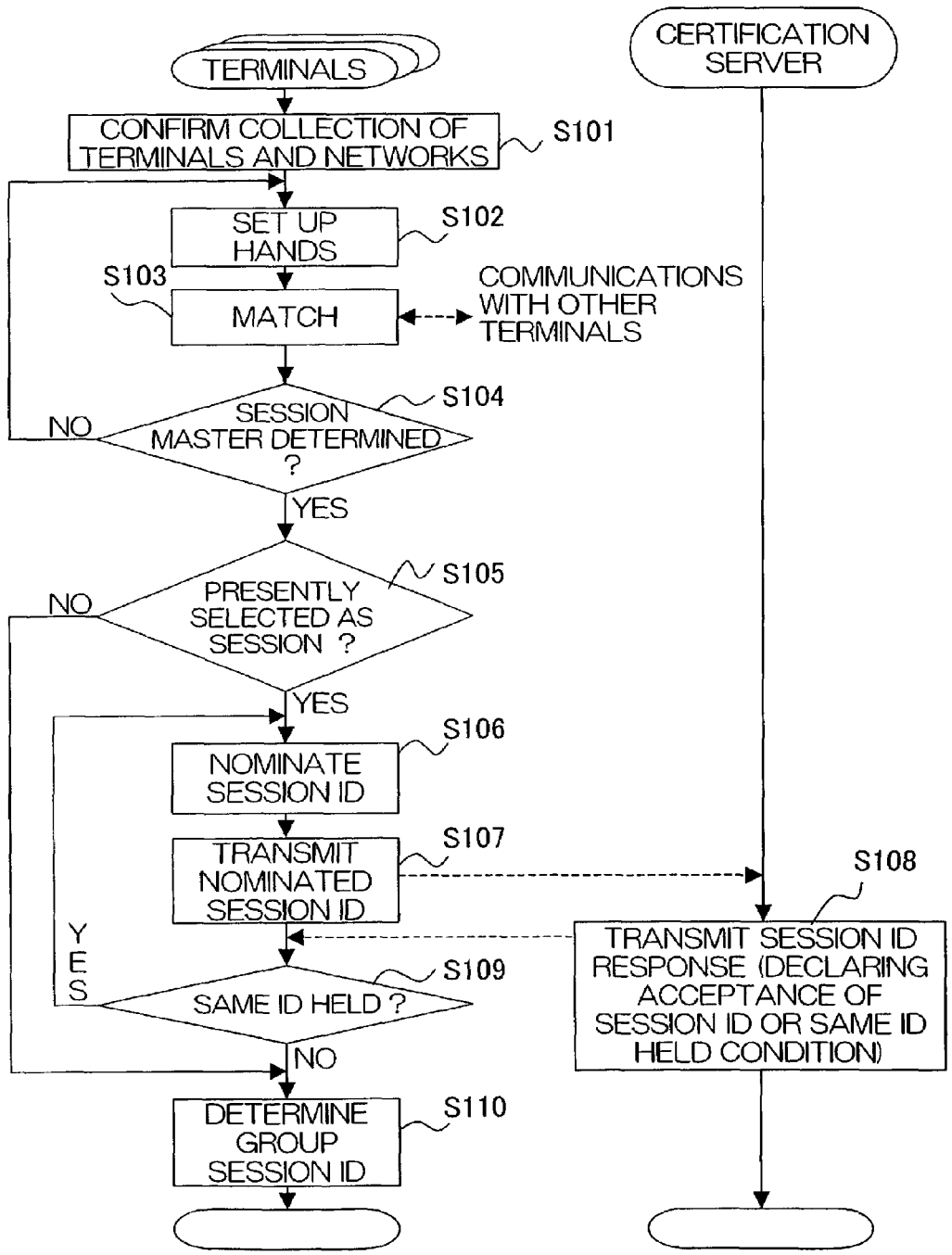
FIG. 4 is a flowchart showing a local session sharing process, which corresponds to step S1 in FIG. 2.

FIG. 4 is a flowchart showing detailed procedures of a local session sharing process, which corresponds to the foregoing step S1 in FIG. 2. This flowchart shows contents of cooperative processing between plural terminals and a single certification server.

In step S101, each of the terminals 1 belonging to the same group confirms a network (or networks) therefor and a collection of terminals related to a local session, which will be established via the network. In step S102, it sets up a 'hand' (or hand pattern) for use in determination of a session master of the local session that will be established via the network. In step S103, a match is performed by exchanging hands in mutual communications between terminals. In step S104, a decision is made as to whether or not a session master is determined by the aforementioned match that is executed in step S103. If 'No', the flow returns to step S102, so that the aforementioned operations will be repeated. If 'YES', the flow proceeds to step S105.

Due to the aforementioned operations, one of the terminals of the same group is determined as a session master, which acts as the representative of the local session to manage communications with the certification server 2.

The aforementioned match of step S103 corresponds to 'janken' (i.e., the game of 'paper, stone, and scissors' using the hands of players), by which a session master is determined, for example. In the case of the janken, each of the terminals 1 selects one of three hand patterns, namely 'paper', 'stone', and 'scissors' in step S102. Specifically, pseudo-random numbers are used to generate natural (integral) numbers of the prescribed range, which are divided by '3' to provide remainders (e.g., 0, 1, or 2). These remainders are related to the aforementioned three hand patterns, namely 'paper', 'stone', and 'scissors' respectively. Thus, each terminal is capable of setting up the hand thereof. The match of step S103 is not necessarily limited to the aforementioned janken game; therefore, it is possible to use any other type of game (e.g., tossing) as the method for determination of a session master.

In step S105, a decision is made as to whether or not each terminal is determined as a session master by itself. If 'YES', the flow proceeds to steps S106 to S109. If 'NO', the flow directly proceeds to step S110.

In step S106, the terminal 1 that is determined as the session master performs calculations using pseudo-random numbers to nominate a session ID (i.e., an identification number of the local session). In step S1107, the terminal 1 transmits the nominated session ID to the certification server 2 via the local network 3 and the wide area network 4. Upon reception of it, the certification server 2 makes a determination as to whether to accept the nominated session ID. In step S108, the certification server 2 replies to the terminal 1 by transmitting a session ID response based on the determination result in step S1107. When the certification server 2 already used the same session ID with the respect to the other local session, the certification server 2 replies to the terminal 1 by transmitting a session ID response including a message of 'same ID held'. Upon reception of the session ID response, the terminal 1 of the session master makes a decision in step S109 as to whether or not the 'same ID held' condition is presented. If 'YES', the flow returns to step S106 so that the terminal 1 is requested to nominate another session ID. If 'NO', that is, when the nominated session ID is successfully accepted by the certification server 2, the flow proceeds to step S110.

In step S110, the session ID accepted by the certification server 2 is determined as a group session ID for all the terminals 1 including the session master belonging to the same group.

Figure 5:
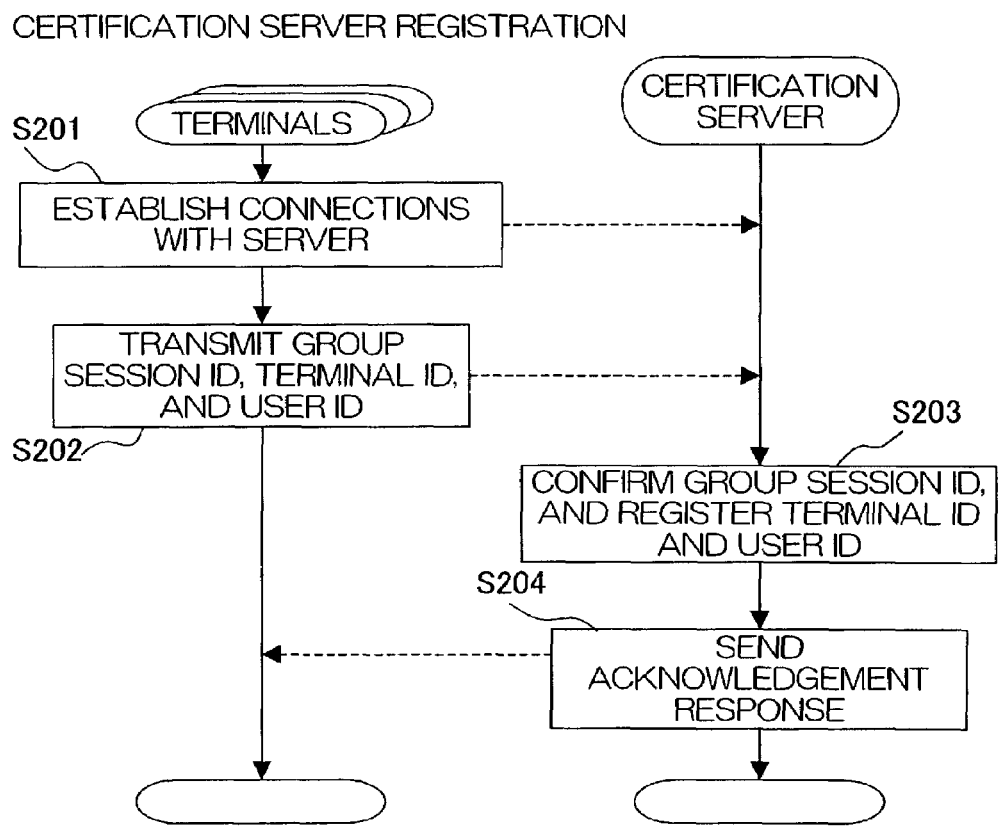
FIG. 5 is a flowchart showing a certification server registration process, which corresponds to step S2 in FIG. 2.

FIG. 5 is a flowchart showing detailed procedures of a certification server registration process, which corresponds to step S2 in FIG. 2.

In step S201, the terminals 1 having their own terminal IDs establish connections with the certification server 2. After the establishment of connections, the flow proceeds to step S202 in which the terminals 1 sends to the certification server 2 the terminal IDs and user IDs thereof as well as the group session ID that is determined in step S110 of the local session sharing process. The terminal IDs are pieces of information allowing terminals to be individually identified. The user IDs are pieces of information allowing users of terminals to be individually identified.

Upon reception of the group session ID and terminal IDs from the terminals 1, the certification server 2 confirms the group session ID and performs processes of registering the terminal IDs and user IDs therewith in step S203, wherein these processes are performed by a terminal registration section thereof. In step S204, the certification server 2 transmits an acknowledgement (or confirmation) response to the terminals 1.

FIG. 6 shows an example of the outline of data and configurations stored in a session management table that is held in the certification server 2. The session management table stores various types of data with respect to five items, namely 'group session ID', 'inter-group ID', 'user ID', 'terminal ID', and 'secret information (or private information)' respectively.

Herein, the data regarding the group session ID, user ID, and terminal ID are sent to the certification server 2 from the terminals 1. The data regarding the inter-group ID are automatically allocated by the certification server 2 in order to identify the terminals 1 respectively, wherein the inter-group IDs may be set to 0, 1, 2, 3, ..., for example. Incidentally, the row (or record) related to the inter-group ID of '0' is not used to list specific data of terminals but to represent the overall data for groups. At the completion of the certification server registration process of FIG. 5, no data is written in the 'secret information' column of the session management table.

Figure 7:
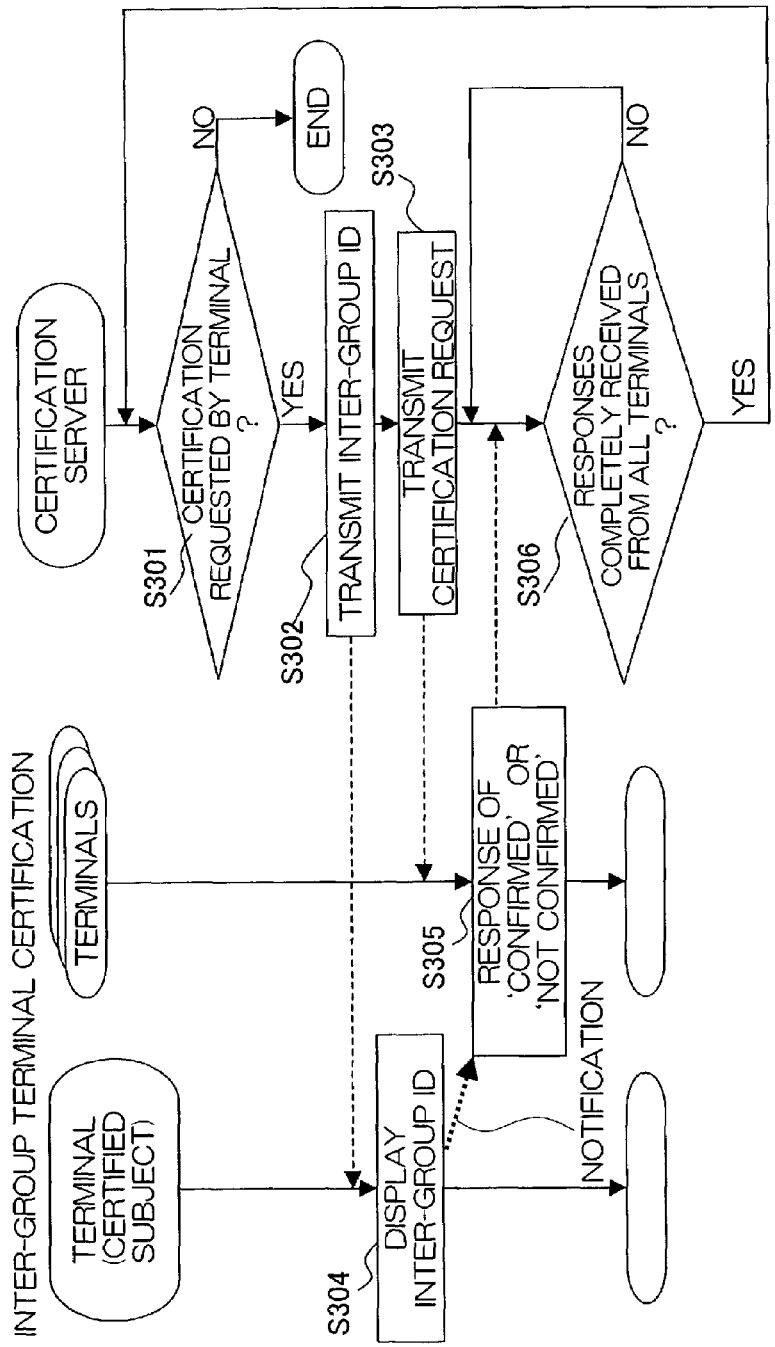
FIG. 7 is a flowchart showing an inter-group terminal certification process, which corresponds to step S3 in FIG. 2.

FIG. 7 is a flowchart showing detailed procedures of an inter-group terminal certification process, which corresponds to the foregoing step S3 in FIG. 2.

In step S301, the certification server 2 makes a decision as to whether or not any one of the terminals 1 requests certification. If 'YES', the certification server 2 performs the following steps. In step S302, the certification server 2 sends an inter-group ID to the terminal 1 that requests certification. In step S303, the certification server 2 sends a certification request to the other terminals belonging to the same group.

In step S304, the terminal 1 that is a certified subject displays the inter-group ID that is received from the certification server 2. This allows the terminal 1 corresponding to the certified subject to notify the users of the other terminals of the same group of the inter-group ID informed from the certification server 2. That is, the users of the other terminals are each able to input the inter-group ID and to make a determination whether to confirm (or authenticate) the terminal 1 corresponding to the certified subject or not. In response to the determination result, the other terminals may be each able to send a response indicating either a message of 'confirmed' or 'not confirmed' to the certification server 2 in step S305.

By the provision of the aforementioned steps S304 and S305, the users of the terminals belonging to the same group may be able to mutually acknowledge progression of certification processing in a face-to-face manner or by mutually speaking to each other.

The certification server 2 receives responses that are issued from the terminals of the same group in step S305. In step S306, the certification server 2 makes a decision as to whether or not it receives responses from all the terminals related to the terminal 1 that issued a certification request. This decision is repeatedly performed until the certification server 2 completely receives responses from all the terminals of the same group. If 'YES', the certification server 2 proceeds to determination whether or not to certify that the terminal 1 corresponds to the certified subject on the basis of contents of the responses sent thereto from the terminals. This determination is performed in the terminal certification section of the certification server 2.

When the aforementioned operations are completed, the flow returns to step S301 with regard to the certification server 2. That is, the aforementioned steps are repeated with respect to the other certified subjects respectively. Thereafter, when the certification server 2 acknowledges all the certified subjects so that no terminal remains as a certified subject, the decision result of step S301 turns to 'NO' so that the certification sever 2 completes the inter-group terminal certification process of FIG. 7.

In summary, the present embodiment is characterized in that the certification server 2 proceeds to certification upon reception of information representing whether to certify the terminal 1 of the certified subject, which is sent thereto from the other terminals belonging to the same group.

The aforementioned inter-group terminal certification process is performed with respect to each of the terminals belonging to the same group just after the local session is established. It is possible to partially modify the inter-group terminal certification process in such a manner that after completion of certification of a certain terminal in one group, certification procedures are automatically executed with respect to a new terminal that newly joins the group and is regarded as a new certified subject.

As described above, the present embodiment is designed in such a way that all the terminals belonging to the same group share the local session, and the certification is performed by the aforementioned procedures shown in FIG. 7. This allows the certification server 2 to confirm terminals by using passwords and to confirm validity of users. Thus, it is possible to reliably prevent unauthorized persons from using terminals in unfair or illegal ways by using passwords that have been appropriated.

In short, the present embodiment is designed under the concept in which each user of the terminal is confirmed and subjected to certification by the users of the other terminals belonging to the same group.

All or some of the users of the terminals connected with the same local network 3 are regarded as constituent members of the same group.

Figure 8:
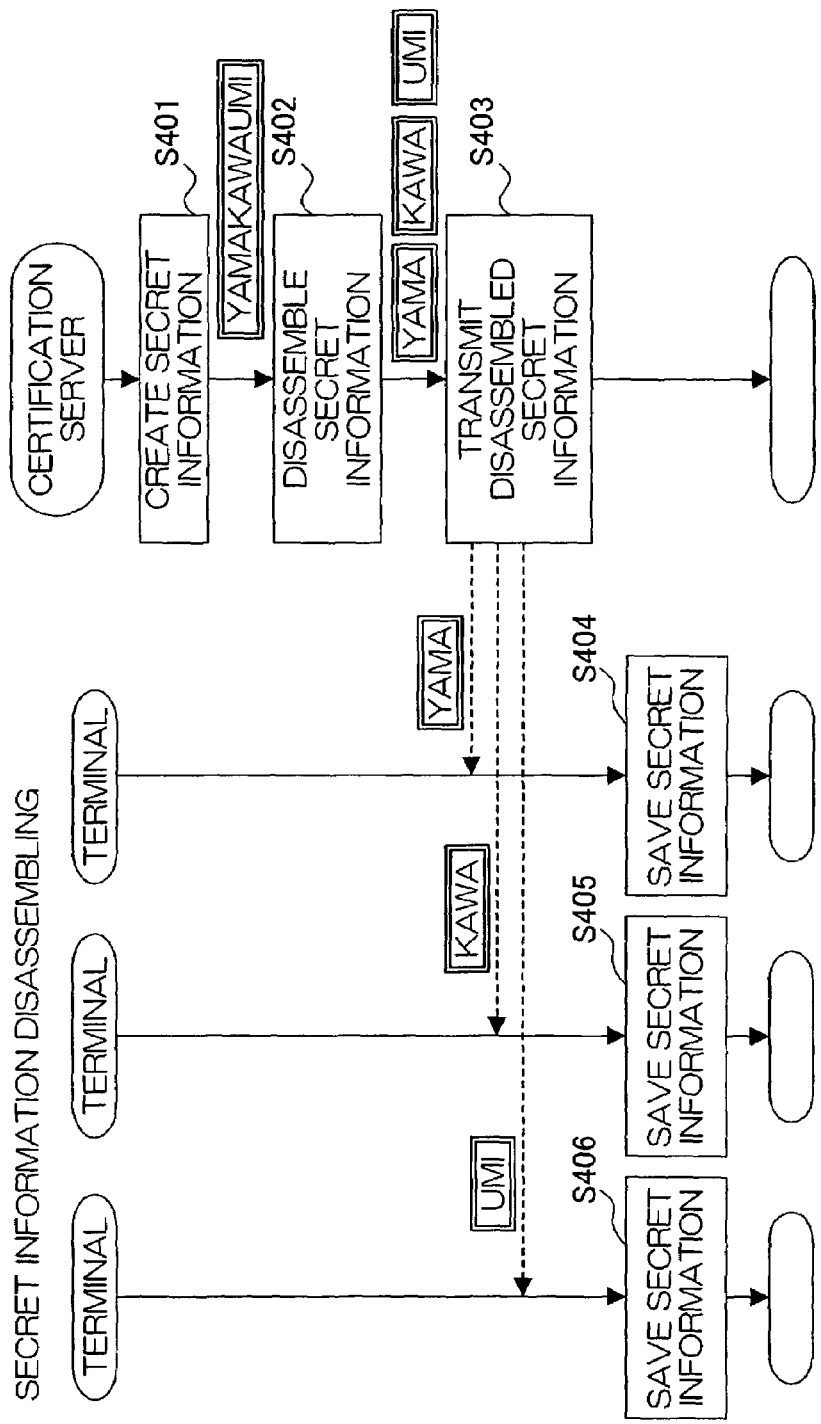
FIG. 8 is a flowchart showing a secret information disassembling process, which corresponds to step S4 in FIG. 2.

FIG. 8 is a flowchart showing detailed procedures of a secret information disassembling process, which corresponds to the foregoing step S4 in FIG. 2.

In step S401, the certification server 2 creates secret information, an example of which shown in FIG. 8 is described as a combination of three Japanese words to read 'YAMAKAWAUMI' (i.e., 'Mountain-River-Sea' in English). In step S402, the certification server 2 performs a secret information disassembling process, in which the aforementioned secret information is disassembled into three word strings, namely 'YAMA', 'KAWA', and 'UMI'. In step S403, the certification server 2 transmits these three pieces of the secret information to different terminals respectively.

Each of the terminals respectively receiving different pieces of the secret information disassembled in step S402 proceeds to steps S404, S405, and S406 respectively, wherein the disassembled secret information is saved in storage media.

FIG. 9 shows the outline configuration of the session management table at the completion of the secret information disassembling process shown in FIG. 8. With respect to the first row of the session management table in which the inter-group ID is set to '0', the overall secret information 'YAMAKAWAUMI' that is created in the aforementioned step S401 is described in the first place (or bracket) of the 'secret information' column. With respect to the following rows of the session management table in which the inter-group ID is set to '1', '2', and '3' in connection with the three different terminals respectively, the aforementioned three pieces of the secret information, i.e., 'YAMA', 'KAWA', 'UMI', are respectively described in the following places (or brackets) of the 'secret information' column.

As the method of disassembling secret information, it is not necessary to use the aforementioned method in which a single word string like 'YAMAKAWAUMI' is simply disassembled into multiple syllables such as 'YAMA', 'KAWA', and 'UMI'. There are numerous examples of studies regarding information disassembling methods such as the (k,n) threshold method. Therefore, it is possible to arbitrarily use any one of the known methods.

Figure 10:
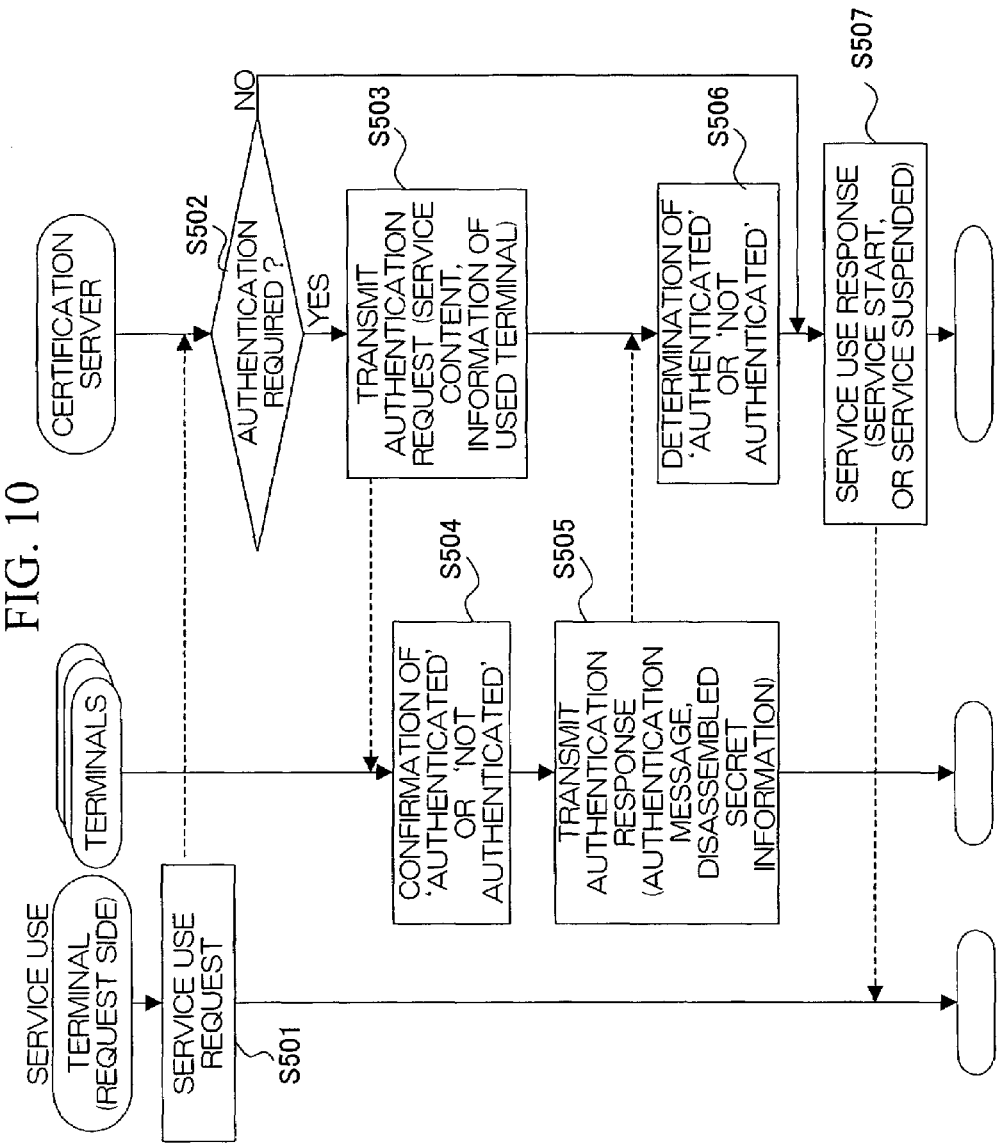
FIG. 10 is a flowchart showing an authentication process mutually performed between terminals whose users request to use online services via networks.

Next, detailed procedures of the authentication process, which is described in conjunction with FIG. 3, will be described with reference to FIG. 10. FIG. 10 is a flowchart showing detailed procedures of the authentication process that is performed mutually between terminals whose users request to use online services via networks.

In step S501, the terminal 1 whose user requests to use services via networks issues a service use request to the certification server 2. Upon reception of the service use request from the terminal 1, the certification server 2 makes a decision in step S502 as to whether or not the requested service requires authentication. If 'NO', the flow directly proceeds to step S507. If 'YES', the flow proceeds to steps S503 to S506 sequentially.

In step S503, with reference to the session management table, the certification server 2 transmits an authentication request to each of the other terminals belonging to the same local session conducted by the 'request-side' terminal 1. This authentication request contains the content of a requested service and the terminal information of the request-side terminal 1.

In step S504, each of the users of the other terminals receiving the authentication request conducts manual operations to make a confirmation as to whether or not the present user of the request-side terminal 1 can be authenticated as an authorized user. That is, each of the other terminals makes a confirmation of 'authenticated' or 'not authenticated', based on which an authentication response is produced. In step S505, the users of the other terminals transmit authentication responses to the certification server 2. Specifically, the authentication responses include authentication messages that are described by manual operations of the users of the other terminals, and the disassembled secret information that are stored in the terminals by the aforementioned procedures shown in FIG. 8.

With reference to the authentication responses sent from the other terminals belonging to the same local session of the request-side terminal 1, the certification server 2 makes a decision in step S506 as to whether or not the present user of the request-side terminal 1 can be authenticated as an authorized user. The certification server 2 performs such a decision process when the prescribed number or more of the other terminals returns authentication responses, each of which describes a confirmation of 'authenticated'. For example, the certification server 2 performs a determination whether to perform the decision process in step S506 on the basis of the result of a decision as to whether or not the number of the disassembled pieces of the secret information exceeds the prescribed threshold, wherein the disassembled pieces of the secret information are respectively included in the authentication responses returned from the other terminals.

In step S507, the certification server 2 transmits to the request-side terminal 1 a service use response based on the decision result of the aforementioned step S506. This service use response includes information as to whether the request-side terminal 1 is allowed to use the service in response to the service use request, or the service cannot be provided to the request-side terminal 1. That is, the certification server 2 issues a service use response of 'service start' or 'service suspended'.

When the certification server 2 determines in step S502 that the service does not require authentication, the flow directly proceeds from step S502 to step S507 by omitting the aforementioned steps S503 to S506, wherein the certification server 2 normally issues a service use response of 'service start'. In contrast, when the certification server 2 determines in step S502 that the service requires authentication, the certification server 2 issues a service use response of 'service start' or 'service suspended' based on the decision result of the step S506.

As described above, the present embodiment is designed in such a way that when the user of the terminal within the same group of terminals belonging to the same local session requests to use the prescribed service via networks, the users of the other terminals perform authentication with respect to the user of the request-side terminal, wherein only when the present user of the request-side terminal can be authenticated as an authorized user, the certification server 2 allows the service to be provided for the request-side terminal. This may greatly improve the safety and security of the networking system. In addition, when the provider(s) of the networking system charges or accounts bills with regard to the use of services requested by the terminals, the aforementioned authentication process of the present embodiment reliably ensures collections of bills with respect to the use of services.

In addition, the present embodiment can be partially modified or further added with various measures and options in processing.

For example, the present embodiment can be modified in such a way that when the prescribed time elapsed after the completion of the certification procedures that the certification sever 2 performed with respect to a certain terminal, the certification server 2 executes the certification procedures again to reconfirm whether or not the terminal can be certified.

Due to the aforementioned modification, even when the terminal that was once certified is held and controlled by an unauthorized person who differs from the authorized user, it may be possible to restrict damage due to the unfair or illegal use of services based on the certification. For example, the credibility established for the user of the 'certified' terminal may be changed or updated as time passes. To cope with such a situation, the aforementioned technique may reliably ensure an accurate decision of certification based on the new updated credibility of the user of the terminal.

In addition, it is possible to introduce credit points with respect to terminals respectively, wherein these credit points are adequately managed as numerical information. Herein, it is possible to set prescribed credit points with regard to types of services in advance. That is, the present embodiment can be modified in such a way that only when the credit points of the terminals exceed the prescribed credit points of the services, these terminals are allowed to use the services.

In the above, the credit points of the terminals can be set in response to degrees of authentication granted by the other terminals. For example, the degree of authentication granted for one terminal is counted as the number of the other terminals that authenticate the user of one terminal.

Next, a second embodiment of this invention will be described in conjunction with FIGS. 11 to 18. The second embodiment is characterized by constituting a general group over plural groups respectively regarding plural local networks, each of which mutually connects together plural users as constituent members, wherein all the users belonging to the general group are able to perform certification and authentication with each other.

Figure 11:
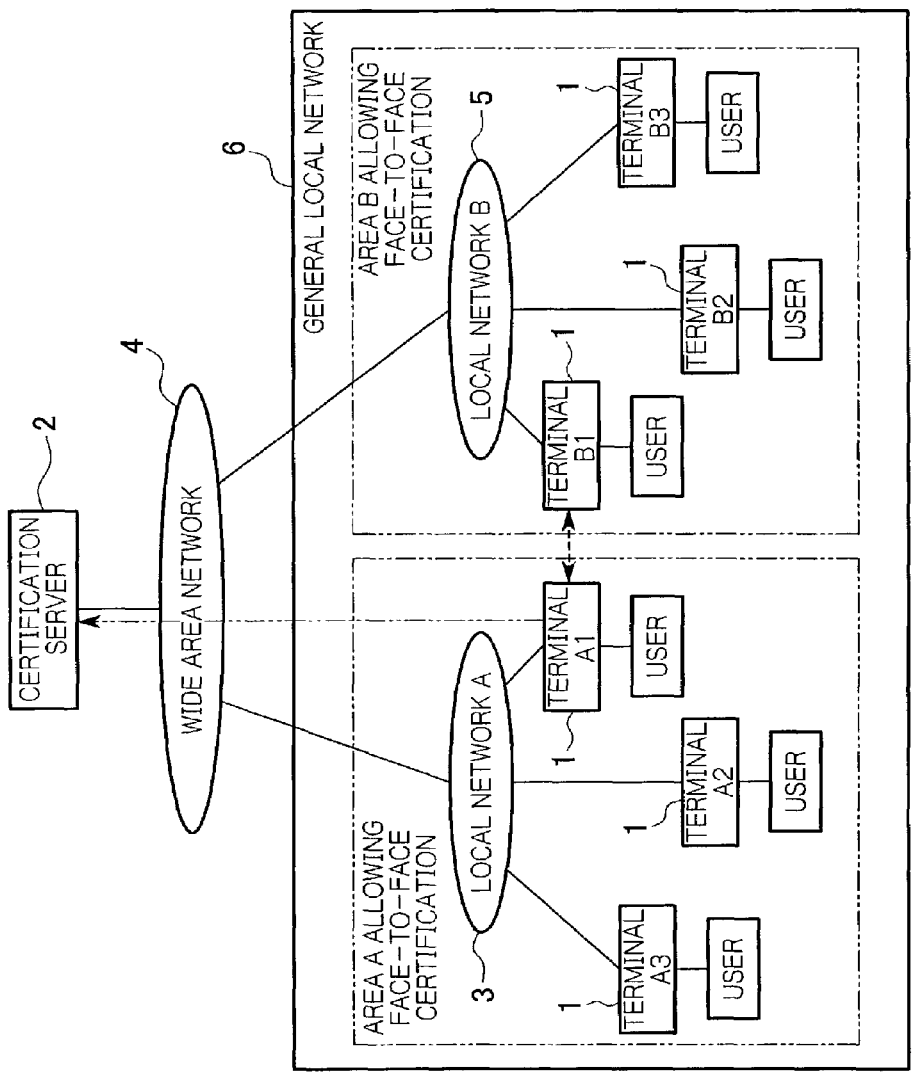
FIG. 11 is a schematic diagram showing the overall configuration of a communication network system in accordance with a second embodiment of the invention.

FIG. 11 shows the overall configuration of a communication network system in accordance with the second embodiment of the invention, wherein reference numeral 1 designate terminals, 2 designates a certification server, 3 designates a local network A, 4 designates a wide area network, 5 designates a local network B, and 6 designates a general local network. The terminals 1 are allocated to the local networks A or B. Specifically, the local network A interconnects together terminals A1, A2, and A3 in an area A allowing face-to-face certification and authentication, while the local network B interconnects together terminals B1, B2, and B3 in an area B allowing face-to-face certification and authentication, wherein all the terminals have the same functions.

The local networks A and B are combined together to form the general local network 6. Of course, the number of local networks constituting the general local network 6 is not necessarily limited to two; hence, it is possible to combine together the arbitrary number of local networks in the form of the general local network 6. In addition, it is possible to combine together multiple local networks and multiple general local networks in the form of a high-order general local network. That is, numerous local networks and general local networks can be collected and combined together in a hierarchical manner.

In FIG. 11, both the local networks A and B are connected with the wide area network 4, which is connected with the certification server 2.

The aforementioned communication network system of FIG. 11 allows mutual communication between the terminals 1 and the certification server 2, and between the terminals 1 via the local networks A and B as well as the wide area network 4.

Specifics of communication protocols and configurations of the terminals 1 used in the second embodiment are similar to those used in the first embodiment; hence, the detailed description thereof will be omitted. Similar to the first embodiment, the users of the terminals 1 construct groups respectively, wherein local sessions (or group sessions) are conducted by units of groups in the second embodiment.

The general local network 6 represents plural local networks, each of which performs communications within a relatively small space accommodating the terminals 1 for the prescribed number of users related to each other. This general local network 6 manages general local sessions (or general group sessions). The local sessions are each managed by the 'representative' terminal within the terminals mutually connected together via the same local network. In the general local session, the certification server 2 realizes certification by the representative terminals communicating therewith. Therefore, it is possible to perform general management on local networks and to extend local networks, each of which is related to certification that is conducted with respect to terminals arranged in a relatively small area. For example, local networks are respectively arranged for groups whose constituent members are positioned in different rooms partitioned by walls, or they are respectively arranged for groups whose constituent members are positioned in different floors. In that case, the present embodiment can perform general management on plural local networks, which are regarded as a single extended networking area.

Figure 12:
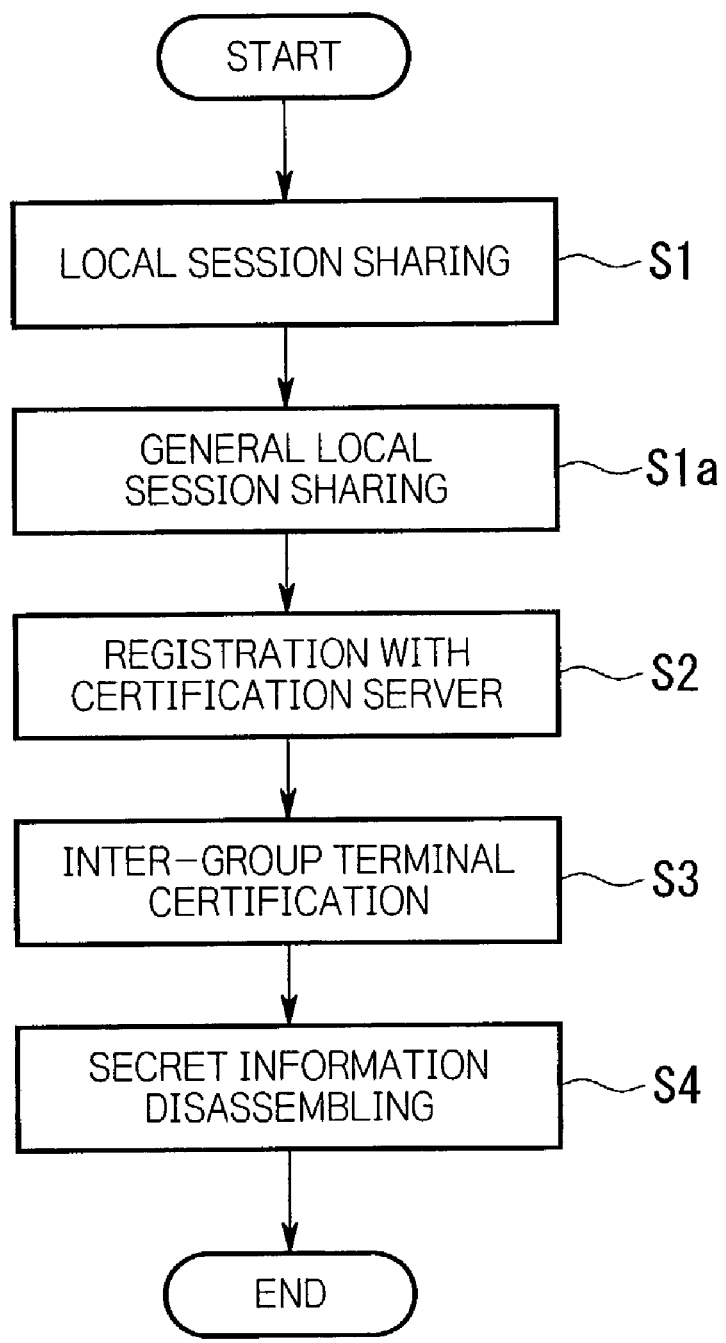
FIG. 12 is a flowchart showing a certification process.

FIG. 12 is a flowchart showing outline procedures of a certification process in accordance with the second embodiment of the invention. In step S1, local sessions are established between terminals by units of groups. Specifically, a local session A is established for the users of the terminals A1 to A3 mutually connected via the local network A, while a local session B is established for the users of the terminals B1 to B3 mutually connected via the local network B, wherein all the users of the same group share the same local session. In step S1a, a general local session is established to perform general management on the local sessions A and B. In step S2, the users of the terminals belonging to these local sessions are registered with the certification server 2. In step S3, the certification server 2 performs certification with respect to the users and terminals registered therewith. In step S4, secrete information disassembling processes are performed with respect to the 'certified' users. Details of the certification process will be described later.

Figure 13:
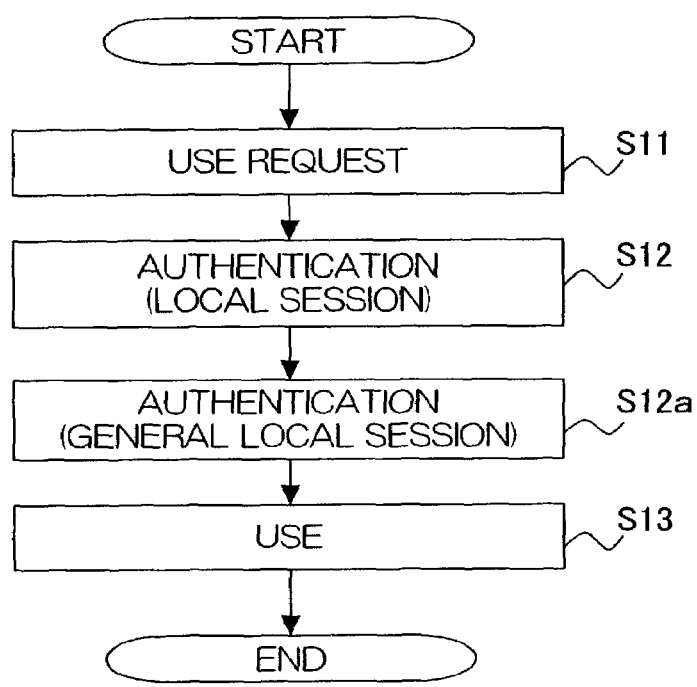
FIG. 13 is a flowchart showing an authentication process.

FIG. 13 is a flowchart showing outline procedures of an authentication process that is performed when each user requests to use the prescribed service via networks. In step S11, the user who requests to use the service issues a use request. In step S12, in response to the use request, the other users sharing the same local session perform authentication with respect to the user who requests to use the service. In step S12a, the certification server 2 performs confirmation or authentication with respect to the service area to which the user issuing the use request belongs with reference to the general local session. In step S13, the certification server 2 allows the user issuing the use request to use the service based on the confirmation or authentication result. Details of the authentication process will be described later.

Next, detailed procedures of the certification process of FIG. 12 will be described with reference to FIGS. 14 to 17.

Figure 14:
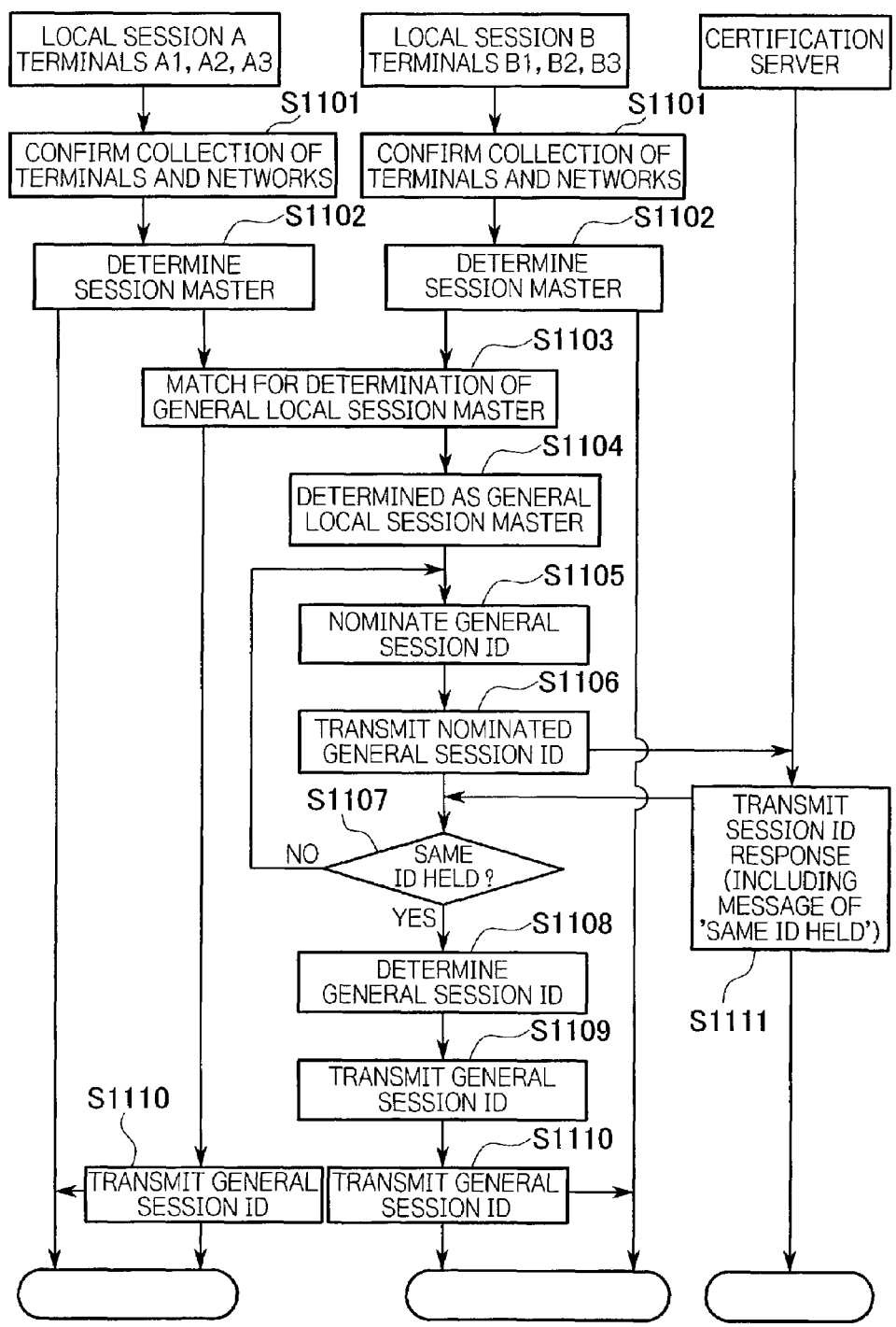
FIG. 14 is a flowchart showing a local session sharing process and a general local session sharing process, which correspond to steps S1 and S1a in FIG. 12.

FIG. 14 is a flowchart showing detailed procedures of the local session sharing process (corresponding to step S1 in FIG. 12) and detailed procedures of the general local session sharing process (corresponding to step S1a in FIG. 12). In this flowchart, plural terminals connected with local networks and a single certification server cooperate together to perform the aforementioned processes.

In step S1101, each of the terminals 1 confirms the network connected therewith and a collection of terminals belonging to a local session to be established in the network. In step S1102, a session master of the local session is determined through the prescribed match such as the janken game, the content of which is described in the foregoing first embodiment. The terminal 1 selected as the local session master proceeds to step S1103, while the other terminals stand by to wait for a notification of a general session ID in step S1110.

In step S1103, plural local session masters, which are determined with respect to plural local networks respectively, perform the prescribed match to determine a general session master for a general local session to be established.

In step S1104, each of the terminals 1 that are selected as the local session masters makes a decision as to whether or not it is selected as a general session master. When selected as a general session master, the corresponding terminal 1 proceeds to steps S1105 to S1109, while the other terminals stand by to wait for a notification of a general session ID issued from the general session master in step S1109.

After the determination of the general session master, the corresponding terminal 1 acts as the representative of the general local session and performs communications with the certification server 2 as necessary.

The prescribed match conducted in steps S1102 and S1103 is not necessarily limited to the janken game; therefore, it is possible to determine session masters through other methods.

In step S1104, the terminal 1 selected as the general session master performs calculations using pseudo-random numbers, for example, to nominate a general session ID for the general local session (i.e., a specific number identifying the general local session). In step S1106, the terminal 1 transmits the nominated general session ID to the certification server 2. Upon reception, the certification server 2 makes a decision as to whether or not the nominated general session ID can be accepted. In step S1111, the certification server 2 transmits a general session ID response based on the decision result. When the certification server 2 already allocated the same general session ID for the other general local session, the certification server 2 describes a message of 'same ID held' in the general session ID response. Upon reception of the general session ID response, the terminal 1 of the general session master makes a decision in step S1107 as to whether or not the message of 'same ID held' is included in the general session ID response. If 'YES', the flow returns to step S1105 to request the terminal 1 of the general session master to nominate another general session ID. If 'NO', in other words, when the certification server 2 accepts the general session ID nominated by the terminal 1 of the general session master, the flow proceeds to step S1108.

In step S1108, the nominated general session ID accepted by the certification server 2 is determined as a general group session ID for all the terminals including the general session master.

In step S1109, the terminal 1 of the general session master transmits the aforementioned general group session ID to the other terminals managed by the local session masters. In step S1110, each of the terminals of the local session masters notify each of the other terminals belonging to the local sessions of the aforementioned general group session ID.

Figure 15:
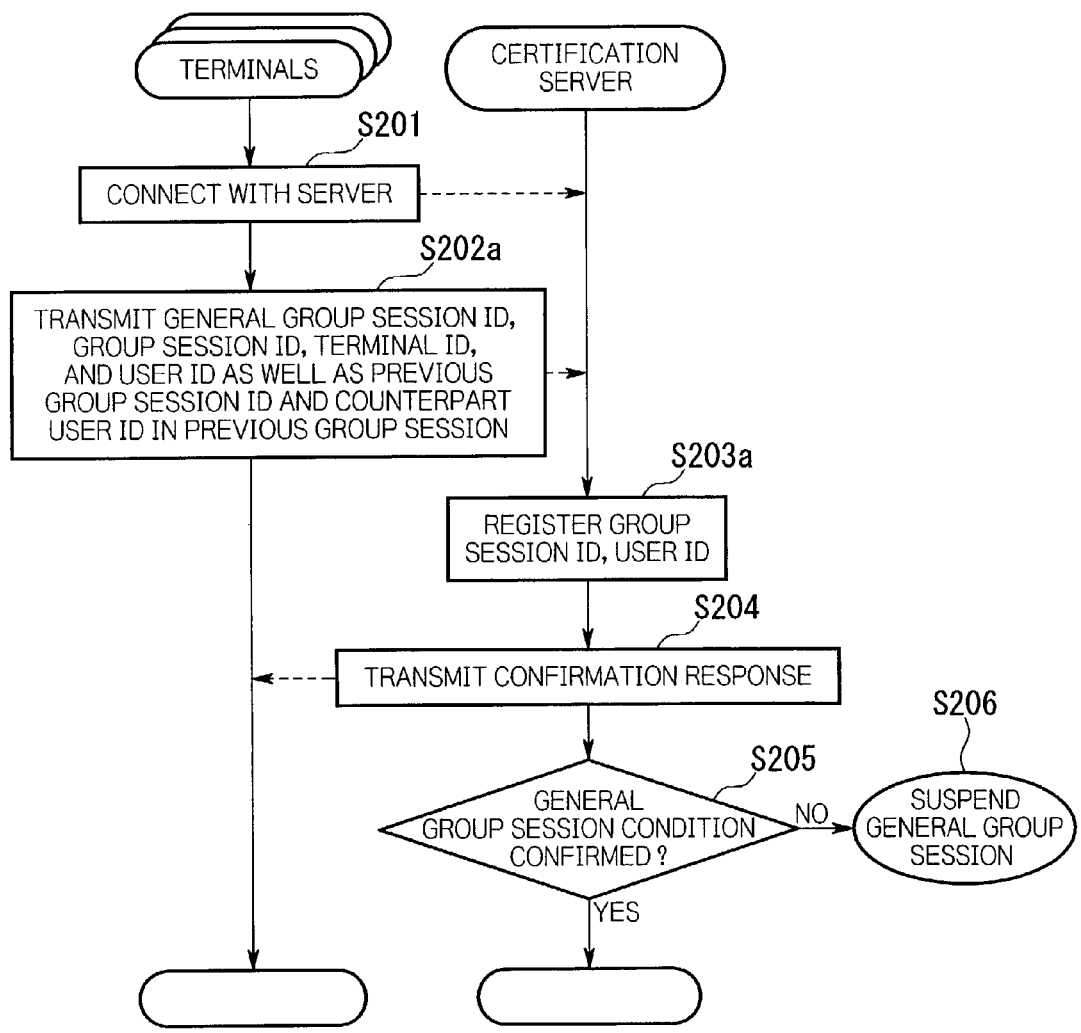
FIG. 15 is a flowchart showing a certification server registration process, which corresponds to step S2 in FIG. 12.

FIG. 15 is a flowchart showing detailed procedures of a certification server registration process, which corresponds to step S2 in FIG. 12.

In step S201, the terminals 1 establish connections with the certification server 2 via networks. After the completion of the establishment of connections, the flow proceeds to step S202a in which each of the terminals 1 transmits to the certification server 2 the general group session ID, group session ID, terminal ID, and user ID as well as the 'previous' group session ID and the counterpart user ID in the previous group session. Herein, the terminal ID identifies each terminal, and the previous group session ID is an identification number of the group session that the user of the terminal belonged to in the past. As the previous group session ID, the present embodiment uses an identification number of the 'preceding' group session that the user of the terminal belonged to just before the present group session. The counterpart user ID is an identification number of the other user who was a constituent member of the previous group session that the user belonged to in the past. As the counterpart user ID, the present embodiment uses an identification number of the other user who was a constituent member of the preceding group session that the user belonged to just before the present group session.

Upon reception of the aforementioned information such as the general group session ID, group session IDs, and terminal IDs from the terminals 1, the certification server 2 performs confirmation with respect to the general group session ID and group session IDs, so that the terminal IDs and user IDs are registered with the session management table in step S203a by the processing of the terminal registration section thereof. In step S204, the certification sever 2 transmits confirmation responses to the terminals 1 via networks. The aforementioned steps S201 to S204 are performed by each of the terminals 1.

After the completion of the registration with respect to all the terminals belonging to the general group session, the certification server 2 makes a confirmation in step S205 as to whether or not general group session conditions are satisfied. If 'NO', the flow proceeds to step S206 in which the general group session is suspended (or stopped). Details of general group session conditions will be described later.

FIG. 16 shows examples of data and configurations stored in a session management table held in the certification server 2 in accordance with the second embodiment of the invention. Compared with the foregoing session management table of the first embodiment shown in FIG. 6, the session management table of the second embodiment is characterized by further including columns regarding 'general group session ID', 'previous session ID', 'previous session user ID', and 'previous session terminal ID'. In response to information transmitted from the terminals 1, the certification server 2 registers the users and terminals with the session management table thereof. At the completion of the registration, various data are described in prescribed places of all the columns except the 'secret information' column. Incidentally, the row (or record) corresponding to the inter-group ID of '0' is not used to described individual information and data of the users but are used to describe the overall data regarding the general group session.

When the certification server 2 completes the registration of the users and terminals belonging to the general group session, the session management table is filled with various data with regard to the general group session. Then, the certification server 2 makes a decision whether to continue or suspend the general group session with reference to the session management table.

Suppose that within users presently belonging to 'group session A', the prescribed number or more of user IDs represent the users who previously belonged to 'group session B' in the past. In that case, it is assumed that the group session B is approved by the group session A. In the case of FIG. 16, three user IDs representing constituent members named 'Tanaka', 'Yamada', and 'Suzuki' presently belong to the group session A, wherein 'Tanaka' is related to a previous session user ID of 'Sato', and 'Yamada' is related to a previous session user ID of 'Ando'. Both 'Sato' and 'Ando' presently belong to the group session B. That is, two users out of three users presently belonging to the group session A are related to the users presently belonging to the group session B. When the prescribed number is set to '1', this example satisfies the aforementioned condition because '2' is greater than prescribed number '1'. Therefore, the group session A approves coexistence of the group session B. In addition, two users out of three users named 'Sato', 'Takahashi', and 'Ando' presently belonging to the group session B are related to two users named 'Tanaka' and 'Yamada' presently belonging to the group session A. This indicates that the aforementioned condition is satisfied because '2' is greater than the prescribed number '1'. Therefore, the group session B approves coexistence of the group session A. That is, the group sessions A and B mutually approve each other. Thus, the certification server 2 determines to continue the general group session over the group sessions A and B.

In the aforementioned example, the session management table of FIG. 16 describes only two group sessions, i.e., group sessions A and B. Of course, a greater number of group sessions can be included in the session management table, so that the aforementioned approval procedures can be similarly performed. That is, the certification server 2 determines to continue the general group session over plural group sessions as long as these group sessions mutually approve each other. In other words, the certification server 2 determines to suspend the general group session when at least one pair of group sessions do not mutually approve each other.

The aforementioned example can be modified in such a way that the users presently belonging to the group session A are paired with the other users who presently belong to the group session B and who are also listed as the previous session user IDs related to the users of the group session A, wherein as the number of such pairs of users (e.g., 'Tanaka' and 'Sato', and 'Yamada' and 'Ando') becomes larger, the session group A increases the credit point granted for the group session B.

The inter-group terminal registration process (corresponding to step S3 in FIG. 12) of the second embodiment is similar to that of the first embodiment; hence, the detailed procedures thereof will be omitted (see FIG. 7).

The secret information disassembling process (corresponding to step S4 in FIG. 12) of the second embodiment is similar to that of the first embodiment; hence, the detailed procedures thereof will be omitted (see FIG. 8).

FIG. 17 shows contents of the session management table after the completion of the secret information disassembling process in the second embodiment. In the row regarding the inter-group ID of '0' in the session management table, the overall secret information (i.e., 'YAMAKAWAUMIKAKIKURIMOMO') is described in the first place of the 'secret information' column. In the following rows of the session management table, disassembled pieces of the secret information (i.e., 'YAMA', 'KAWA', 'UMI', 'KAKI', 'KURI', and 'MOMO') are respectively described in the following places of the 'secret information' column.

Next, detailed procedures of the authentication process of FIG. 13 will be described, wherein in the general group session, results of the authentication mutually conducted by the terminals regarding one local session are accepted by the other terminals regarding the other local session, thus mutual authentication is established.

FIG. 18 is a flowchart showing detailed procedures of the authentication process that is performed by the terminals whose users request to use prescribed services via networks. Steps S501 to S507 of the authentication process of FIG. 18 are substantially identical to those of the aforementioned authentication process of FIG. 10; hence, the detailed description thereof will be omitted. Compared with the first embodiment, the second embodiment introduces minor modification with respect to steps S503 to S505, wherein when the certification server 2 issues an authentication request in order to certify the request-side terminal 1 that requests to use a prescribed service via networks, the authentication request is transmitted not only to the terminals belonging to the same local session of the request-side terminal 1 but is also transmitted to the other terminals belonging to the same general local session of the request-side terminal 1. Therefore, all the terminals of different groups belonging to the same general local session of the request-side terminal 1 return authentication responses to the certification server 2, so that the certification server 2 makes a determination as to whether or not the terminal 1 of the certified subject is certified on the basis of the authentication responses.

After completion of step S507, the flow proceeds to step S508 in which the request-side terminal 1 transmits a service request to a service provider (or computer facilities located as a prescribed site connected with networks). Upon reception of the service request, the service provider transmits an authentication information request to the certification server 2 in step S509. In step S510, the certification server 2 transmits an authentication information response to the service provider. In step S511, the service provider makes a service response based on the authentication information response.

As described above, the second embodiment broadens the overall range of local sessions by interconnecting together these local sessions via a wide area network. This increases the total number of terminals, which are mutually authenticated by each other and are certified by the certification server 2. That is, it is possible to increase a degree of authentication among the terminals. Thus, the service provider is capable of providing services to the terminals in a safer manner with a high degree of security.

Both the terminals 1 and the certification server 2 are realized using computer systems, wherein certification processes, authentication processes, and service using processes are stored in computer-readable storage media in the form of programs. Therefore, the aforementioned processes are carried out by computers that read and execute programs. Herein, the computer-readable storage media correspond to magnetic disks, magneto-optical disks, CD-ROMs, DVD-ROMs, and semiconductor memories, for example. The aforementioned programs can be distributed to the computers via communication lines, so that the computers can execute the programs distributed thereto.

The aforementioned processing and schemes of authentication and certification can be applied to various fields regarding business methods, networking services, and the like. For example, it is possible to constitute a specific architecture or structure allowing only the users who are authenticated and certified to use prescribed computer resources and network resources in computer systems and networks. In other words, when various services are provided with charges via networks or when various commodities are sold via networks, only the users who are authenticated and certified can enjoy services or purchase commodities via networking systems. In this case, it is possible to introduce joint responsibility for the other users who authenticate the user who requests to use the prescribed networking service and claims payment of a bill therefor.

The aforementioned embodiments shown in the drawings are illustrative and not restrictive; hence, they can be further modified or changed by design choices, which do not depart from the scope of the invention.

As described heretofore, this invention has a variety of effects and technical features, which will be described below.

(1) This invention provides a brand-new certification method for users and computers (e.g., terminals), wherein a certification server determines whether to certify a request-side terminal based on results of authentication performed by the other terminals of the same group. Therefore, this invention can noticeably improve the safety and security in certifying between the terminal and server in comparison with the conventional method that performs certification simply using a password and the like.

(2) The users of the terminals connected together with the same local network act as constituent members of the same group, so that they can mutually authenticate each other within the same group, which allows the certification server to reliably certify each of the terminal. Therefore, it is possible to noticeably improve the reliability in certification. The local network can be constituted using ethernet cables or using wireless communication such as bluetooth. This allows the users, whose terminals are arranged in a physically proximate range or in a relatively small area such as a room or floor, to constitute the same group. That is, the users of the same group can confirm or authenticate each other in a face-to-face manner. Thus, the certification server can reliably perform certification based on results of confirmation or authentication.

(3) This invention introduces a local session sharing process in which one of the terminals regarding the same group or same local session is determined as a session master, so that the terminal regarded as the session master acts as the representative of the local session that is conducted between the terminals of the same group. Therefore, it is unnecessary to constitute the group in a fixed manner in advance. That is, it is possible to raise a degree of freedom in constituting the group.

(4) After completion of certification of terminals of the same group, a newly joined terminal can be promptly acknowledged as a new certified subject and is subjected to an inter-group certification process. That is, it is possible to freely introduce a new terminal into the group at an arbitrary timing.

(5) The certification server is designed to create and disassemble secret information, so that disassembled pieces of the secret information are respectively distributed to the terminals via networks. The terminals store or save the disassembled pieces of the secret information. This allows the sever to arbitrarily collect and use the disassembled pieces of the secret information at an appropriate timing. For example, when a certain terminal requests to use a prescribed service via networks, the server can make determination as to whether or not the request-side terminal should be certified in response to the number of the disassembled pieces of the secret information, which are collected from the other terminals via networks.

(6) When the terminal issues a service use request regarding a prescribed service to the certification server, the certification server transmits an authentication request to each of the other terminals which were already certified. Based on authentication responses returned from these terminals, the certification server makes a determination whether to allow the user of the request-side terminal to start the prescribed service. Therefore, it is possible to reliably avoid an unauthorized person from using the service by operating the request-side terminal in an unfair or illegal way. When charging a bill for the use of the service, it is possible to introduce joint responsibility for the other users of the terminals of the same group who authenticate the user of the request-side terminal. This ensures reliable collection of a bill for the user of the service from the user of the request-side terminal. Similarly, it is possible to ensure reliable collection of a bill for the purchase of a commodity sold via networks from the user of the terminal who purchases it via networks.

(7) This invention also allows all the users of different groups respectively connected with different local networks to constitute the same general group, so that all the users of the same general group can mutually authenticate each other. That is, a general local network can be constituted by interconnecting together various local networks via a wide area network in a hierarchical manner, wherein a general local session is established over local sessions conducted by terminals of local networks respectively. All the users of the terminals belonging to the same general local network can share the general local session via local networks and the wide area network. In the general local session, results of certification and authentication mutually performed between local sessions can be accepted and used by the other local sessions. Therefore, all the users of the terminals belonging to the same general local session can share results of certification and authentication mutually performed therebetween.

(8) Even if a terminal of a certified subject is located far from the other terminals, in other words, even if it is located in a different room or on a different floor and is isolated from the other terminals so that its user is not placed in a face-to-face manner with the users of the other terminals, the general local network may guarantee reliable certification and authentication based on results of certification and authentication that were conducted via local networks. That is, it is possible to receive results of certification and authentication from numerous constituent members of the general local network compared with a single local network. This further improves a degree of certification and authentication. The hierarchical structure of the general local network realizes common sharing of results of certification and authentication, which are performed with respect to various local networks respectively. Therefore, it is possible to noticeably reduce the number of subjects which should be certified or authenticated in the general local network compared with mutual certification or authentication between constituent members belonging to various local networks. This reduces networking traffics required in certification and authentication.

(9) This invention allows the general local session to continue only when the prescribed condition in which the users belonging to various local sessions mutually and previously shared these local sessions in the past is satisfied, whereas the general local session is suspended (or terminated) when the prescribed condition is not satisfied. That is, the general local session is not established between unfamiliar persons or strangers but is established between familiar users who commonly shared the same local sessions in the past. Therefore, all the users or constituent members can commonly share the same general local session in a mutual situation of trust. This ensures a relatively high degree of security in networking services.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A certification method applicable to a networking system constituted by a plurality of terminals respectively operated by a plurality of users, and a certification server connected together via a network, said certification method comprising the steps of:

performing a local session sharing process for allowing the plurality of terminals interconnected together via a local network to share a same local session with each other;

performing a certification server registration process for controlling the certification server to register the plurality of terminals; and performing a certification process in response to a service use request from a first user of a first terminal within the plurality of terminals belonging to the local session by sending identification information to the first terminal from the certification server and sending authentication requests from the certification server to the other users of the plurality of terminals other than the first terminal asking whether to authenticate the first user of the first terminal, the first user of the first terminal directly communicating the identification information to the other users of the plurality of terminals, a second user of a second terminal within the plurality of terminals receiving the authentication request and the identification information confirms the authentication of the first user with the other users of the plurality of terminals other than the first and second terminals, and transmitting responses to the authentication requests and the identification information to the certification server, which in turn makes a determination whether to certify the first terminal whose user issued the service use request based on the responses to the authentication requests and the identification information.

2. A certification method according to claim 1, wherein the local session sharing process selects one of the terminals belonging to the same local session as a session master, so that the terminal selected as the session master transmits identification information of the local session to the certification server.

3. A certification method according to claim 2, wherein the certification process transmits identification information of a terminal which is subject to certification to the certification server, which in turns transmits a certification request to each of the other terminals of the same group, so that the certification server makes a determination whether to certify the terminal which is subject to certification on the basis of responses from the other terminals each receiving the certification request.

4. A certification method according to claim 2, wherein, after every terminal of the plurality of terminals belonging to the same local session has been certified, a new terminal newly joining the local session is subjected to the certification process.

5. A certification method according to claim 2 further comprising a secret information disassembling process in which the certification server creates and disassembles secret information, so that disassembled pieces of the secret information are distributed to the terminals of the plurality of terminals which were already certified in advance, so that the terminals of the plurality of terminals store the disassembled pieces of the secret information therein.

6. A certification method according to claim 2, wherein when the terminal issues a service use request to use a prescribed service, the certification server performs a service use authentication process to transmit an authentication request to each of the other terminals of the plurality of terminals which are certified in advance in the certification process, so that the certification server makes a determination based on authentication responses, which are returned from the other terminals, whether to allow the terminal issuing the service use request to start the service.

7. A certification method according to claim 3, wherein, after every terminal within the plurality of terminals belonging to the same local session has been certified, a new terminal newly joining the local session is subjected to the certification process.

8. A certification method according to claim 3 further comprising a secret information disassembling process in which the certification server creates and disassembles secret information, so that disassembled pieces of the secret information are distributed to the terminals of the plurality of terminals which were already certified in advance, so that the terminals of the plurality of terminals store the disassembled pieces of the secret information therein.

9. A certification method according to claim 3, wherein when the terminal issues a service use request to use a prescribed service, the certification server performs a service use authentication process to transmit an authentication request to each of the other terminals of the plurality of terminals which are certified in advance in the certification process, so that the certification server makes a determination based on authentication responses, which are returned from the other terminals, whether to allow the terminal issuing the service use request to start the service.

10. A certification method according to claim 1, wherein, after every terminal within the plurality of terminals belonging to the same local session has been certified, a new terminal newly joining the local session is subjected to the certification process.

11. A certification method according to claim 1 further comprising a secret information disassembling process in which the certification server creates and disassembles secret information, so that disassembled pieces of the secret information are distributed to the terminals of the plurality of terminals which were already certified in advance, so that the terminals of the plurality of terminals store the disassembled pieces of the secret information therein.

12. A certification method according to claim 1, wherein when the terminal issues a service use request to use a prescribed service, the certification server performs a service use authentication process to transmit an authentication request to each of the other terminals of the plurality of terminals which are certified in advance in the certification process, so that the certification server makes a determination based on authentication responses, which are returned from the other terminals, whether to allow the terminal issuing the service use request to start the service.

13. A certification method according to claim 1, wherein a plurality of local networks are mutually connected to each other, so that in the local session sharing process, the plurality of terminals constitute a group to share the same local session in each of the plurality of local networks, and wherein a general local session sharing process, all the terminals connected with the plurality of local networks respectively are combined together to form a general group to share a same general local session.

14. A certification method according to claim 13, wherein in the local session sharing process, one of the terminals is selected as a session master to act as a representative of the group thereof in each of the local networks, and wherein in the general local session sharing process, one of session masters representing local sessions respectively is selected as a general session master to act as a representative of the general group, so that the general session master transmits identification information of the general local session to the certification server.

15. A certification method according to claim 13 further comprising the step of: performing a secret information disassembling process in which the certification server creates and disassembles secret information, so that disassembled pieces of the secret information are respectively transmitted to the terminals constituting the general group, and the terminals of the general group store the disassembled pieces of the secret information therein.

16. An authentication method applicable to a networking system constituted by a plurality of terminals respectively operated by a plurality of users, and a certification server connected together via a network, wherein when a first user of a first terminal issues a service use request to use a prescribed service, the certification server transmits identification information to the first terminal, the certification server transmits an authentication request to each of the other terminals other than the first terminal, which are certified in advance, the first user of the first terminal directly communicating the identification information to the other users of the plurality of terminals, a second user of a second terminal within the plurality of terminals receiving the authentication request and the identification information confirms the authentication of the first user with the other users of the plurality of terminals other than the first and second terminals, so that the certification server makes a determination based on authentication responses and the identification information, which are returned from the other terminals, whether to allow the first terminal issuing the service use request to start the service.

17. A certification method applicable to a networking system including a plurality of local networks, each of which is constituted by a plurality of terminals connected to a certification server via a network, wherein in a local session sharing process, the plurality of terminals constitute a same group to share a same local session in each of the plurality of local networks, and wherein a general local session sharing process, all the terminals connected with the plurality of local networks respectively are combined together to form a general group to share a general local session, comprising the steps of:

performing an authentication process wherein a first user of a first terminal issues a service use request to use a prescribed service, the certification server transmits identification information to the first terminal, the certification server sends authentication requests to the other users of the plurality of terminals other than the first terminal asking whether to authenticate the first user of the first terminal, the first user of the first terminal directly communicates the identification information to the other users of the plurality of terminals, a second user of a second terminal within the plurality of terminals receiving the authentication request and the identification information confirms the authentication of the first user with the other users of the plurality of terminals other than the first and second terminals, and the certification server confirms the other terminals sharing the general local session whether to authenticate the first terminal issuing the service use request, so that the certification server makes a determination whether to authenticate the first terminal based on results of confirmation returned from the other terminals; and controlling the certification server based on a determination result to transmit an authentication information response in response to an authentication information request transmitted thereto from a service provider that is requested to provide the service by the first terminal.

18. A certification server applicable to a networking system containing a plurality of terminals connected together via a local network, the plurality of terminals that are combined together to form a same group in connection with the local network to share a local session therebetween are registered with a terminal registration section, and wherein certification is made with respect to a terminal of a certified subject on the basis of information, representing whether to authenticate the first terminal, from the other terminals of the same group, wherein the certification server transmits identification information to the first terminal, the certification server transmits an authentication request to each of the other terminals other than the first terminal, a first user of the first terminal directly communicates the identification information to other users of the plurality of terminals, a second user of a second terminal within the plurality of terminals receiving the authentication request and the identification information confirms the authentication of the first terminal with the other users of the plurality of terminals other than the first and second terminals.

19. A certification server applicable to a networking system containing a plurality of terminals connected together via a local network, wherein the plurality of terminals are combined together to form a same group in connection with the local network to share a local session, and wherein upon reception of a service use request issued by a first terminal that requests to use a prescribed service, the certification server transmits identification information to the first terminal, an authentication request is then transmitted to each of the other terminals of the same group which are certified in advance, a first user of the first terminal directly communicates the identification information to other users of the plurality of terminals, a second user of a second terminal within the plurality of terminals receiving the authentication request and the identification information confirms the authentication of the first terminal with the other users of the plurality of terminals other than the first and second terminals so that a determination is made based on authentication responses and the identification information, which are returned from the other terminals, as to whether or not the first terminal issuing the service use request is allowed to start the service.

20. A certification system applicable to a networking system interconnecting a plurality of local networks, each of which is connected with a plurality of terminals that constitute a same group to share a same local session, wherein all terminals are combined together to form a general group to share a general local session, said certification system comprising:

a certification server for upon reception of a service use request issued by a first terminal belonging to the general group to use a prescribed service, transmitting identification information to the first terminal, transmitting an authentication request to each of the other terminals of the general group, a first user of the first terminal directly communicating the identification information to other users of the plurality of terminals, a second user of a second terminal within the plurality of terminals receiving the authentication request and the identification information confirms the authentication of the first terminal with the other users of the plurality of terminals other than the first and second terminals so that a determination is made based on authentication responses and the identification information, which are returned from the other terminals, as to whether or not the first terminal issuing the service use request is allowed to start the service; and a service provider for upon reception of the service use request from the first terminal, transmitting an authentication information request regarding the first terminal to the certification server, so that the service is provided to the first terminal based on an authentication information response that is returned from the certification server, wherein in response to the authentication information request from the service provider, the certification server transmits the authentication information response to the service provider on the basis of a result of the determination as to whether or not the first terminal issuing the service use request is allowed to start the service.

* * * * *